Dec. 2, 1969  E. BRODKORB ET AL  3,481,707

APPARATUS FOR AUTOMATIC COLORIMETRIC TITRATION

Filed May 9, 1966

INVENTORS:
ERNST BRODKORB
HERBERT SCHERER

BY: Marzall, Johnston, Cook & Root
ATT'YS

United States Patent Office 3,481,707
Patented Dec. 2, 1969

3,481,707
APPARATUS FOR AUTOMATIC COLORIMETRIC TITRATION
Ernst Brodkorb and Herbert Scherer, Ludwigshafen (Rhine), Germany, assignors to Badische Anilin- & Soda-Fabrik Aktiengesellschaft, Ludwigshafen (Rhine), Germany
Filed May 9, 1966, Ser. No. 548,447
Claims priority, application Germany, May 15, 1965, B 81,950; Mar. 9, 1966, B 86,111
Int. Cl. G01n 31/16
U.S. Cl. 23—253                                    5 Claims

ABSTRACT OF THE DISCLOSURE

Apparatus for automatic colorimetric titration comprising a light source for penetrating the solution to be titrated with diffused light, at least two photoelectric cells arranged in bridge connection, and a color filter arranged in front of each cell. The colors of the filters are such that when the color of the liquid being titrated changes, the intensity of the light impinging on the cells is changed differently, thereby producing a change of potential across the bridge, which change of potential may be used to stop the supply of titrant.

---

The present invention relates to apparatus for automatic colorimetric titration.

In photometric titration, the change in color of a suitable indicator or the change in color of the solution itself at the end point of a titration is recorded in a graph. The degree of transmission or the extinction of the given solution at a wavelength at which the extinction difference of the solution before and after the change in color is as great as possible is plotted on one coordinate and the volume of the titrant added is plotted on the other coordinate.

Recording such transmission/volume graphs may be done manually point by point or by a suitable recording instrument. A break in this graph corresponds to the point at which the color indicator changes color or to the equivalence point of the solution.

To carry out such a titration automatically, instruments are required in which the supply of titrant is interrupted as soon as a predetermined degree of transmission has been reached or as soon as a break occurs in the transmission/volume curve.

In these instruments, a ray of light which has a small cross-section and penetrates only a small fraction of the solution to be investigated is used for measuring the degree of transmission. This method has the following disadvantages:

(1) Titrations can only be carried out in special titration cells. If it is desired to carry out the titration in a vessel of another shape, a troublesome readjustment of the path of the ray is necessary.

(2) Turbid solutions or solutions which become turbid during titration cannot be titrated because the ray of light used for measurement is greatly scattered.

(3) If the titration solution contains extraneous materials, as for example glass splinters, as in hydroxyl number determination by the small pressure tube method, or air bubbles formed by the necessary vigorous stirring of the solution, errors may airse by temporary interruption of the light ray.

The object of this invention is to provide equipment for automatic colorimetric titration by which the said sources of error are obviated.

According to this invention this is achieved by means of equipment in which light is passed through the liquid to be titrated and after having passed therethrough impinges on light-sensitive cells and the electric signal thus induced is used to control the flow of the titrant, by passing through the liquid to be titrated diffuse light which is collected by at least two light-sensitive cells arranged in bridge connection, and before impinging on these cells the light is passed through a filter arranged in front of each cell and having a color chosen so that the intensity of the light impinging on the cells is changed in as different degrees as possible upon a change in color of the liquid to be titrated.

For passing light through the liquid to be titrated use may be made either of a plurality of light sources arranged around the vessel for the liquid, or of a vessel located in a container whose inner walls reflect light from a light source and thus pass diffuse light through the whole liquid. In this way disturbances which could occur by extraneous materials, as for example glass splinters or air bubbles contained in the liquid, are excluded.

According to another feature of the invention, filters of different colors are disposed in front of the cells, the colors of the filters being chosen so that the intensity of the light falling on the light-sensitive cells is changed to different extents. The greater the difference in the change in light intensity, the greater the sensitivity of the apparatus. The greatest possible difference in change is brought about when the color of one filter corresponds to the color of the titration solution and the color of the other filter corresponds to its complementary color before or after the change in color. Thus for example when titrating a solution which changes in color from blue to red and when using two light-sensitive cells, one cell may be provided with a blue filter and the other cell with an orange red filter. Whereas in the case of the cell provided with a blue filter the intensity of the light impinging on the cell after the change in color decreases, the light intensity in the case of the other cell provided with an orange red filter increases. The sensitivity of the apparatus may be further increased by using, for example, four cells instead of only two, two cells each being provided with a blue filter and the other two cells each with an orange red filter. Instead of the blue and orange red filters, obviously red and green filters may be used, i.e. colors corresponding to the color and complementary color of the titration solution after its change of color. A further increase in the sensitivity of this equipment may be achieved by providing each of the four cells with a filter having a different color from the others; for example, if the change of color of the titration solution is from blue to red, one cell may have a blue filter and another cell an orange red filter, corresponding to the color and complementary color of the solution prior to the end point, the other two cells having a red filter and a green filter corresponding to the color and complementary color of the solution after the end point. In the case of solutions which change from colorless to red, as is the case for example in the titration of acids with alkalies using phenolphthalein, one red filter and one green filter is used in an arrangement having two light-sensitive cells.

The various cells are arranged in bridge connection so that the cells in which the light intensity changes in the same sense are opposite each other and adjacent to the cells in which the light intensity changes in the other sense. In this way the voltage at the end point of the bridge circuit, which as a rule is made equal to the value zero at the beginning of the titration, achieves the highest possible value at the end of the titration, i.e. at the end point of the solution. This voltage induces a signal which is used to interrupt the supply from an automatic burette.

The invention will now be described with reference to the accompanying drawings, which show diagrammatically an embodiment of apparatus according to the invention by way of example.

Figure 1:
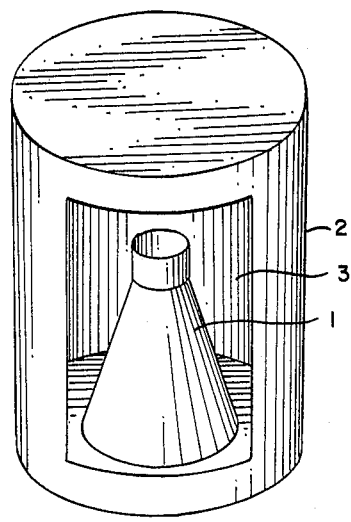
FIGURE 1 is a perspective view of an embodiment of the apparatus for automatic colorimetric titration.
Figure 2:
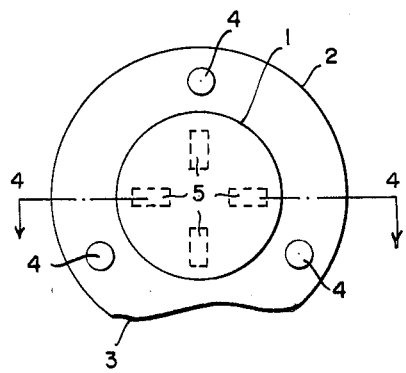
FIGURE 2 is a top plan view, in fragment, of said embodiment.
Figure 4:
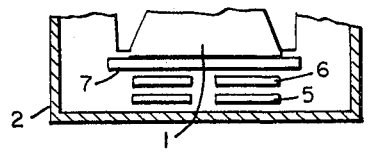
FIGURE 4 is a fragmentary section view of the bottom portion of the apparatus of FIGURES 1 and 2 as taken on section plane 4—4 of FIGURE 2.

A glass vessel 1 filled with the liquid to be titrated is located inside a cylindrical sheet-metal casing 2 which is provided with an opening 3. A number of fluorescent lamps 4 are provided inside the casing 2 which together with the inner wall of the casing 2 produce a diffuse light. Four light-sensitive cells 5 are provided on the base of the casing beneath the transparent plate 7; these may be for example photocells, photodiodes or photoresistances. Light penetrates the whole volume of the titration liquid so that local disturbances caused by air bubbles or particles present in the liquid, for example glass splinters, are eliminated. Filters 6 are provided in front of the cells, their color corresponding to that of the indicator before and after its change of color.

Figure 3:
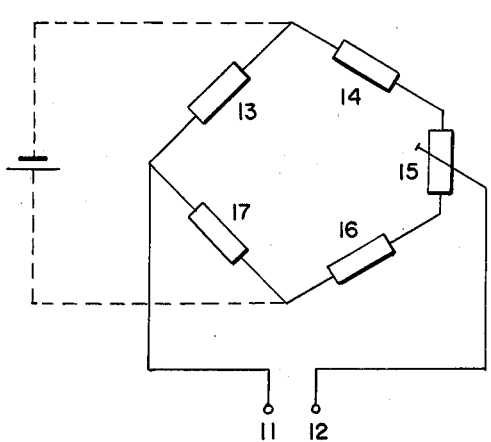
FIGURE 3 is an electrical circuit diagram embodying the light sensitive cells and a balancing potentiometer.

FIGURE 3 is the circuit diagram for the light-sensitive cells 13, 14, 16 and 17. 15 is a balancing potentiometer. At the beginning of the titration, this potentiometer is adjusted so that there is no voltage at the points 11 and 12. Upon the change of color in the titration, a voltage is produced at the points 11 and 12 which is used to interrupt the flow of titrant.

In an arrangement for titrating a solution which changes from colorless to red and in which four light-sensitive cells are used two green filters and two red filters are used. The cells in front of which a red filter has been arranged are numbered 13 and 16 in the drawing, and the cells provided with a green filter are numbered 14 and 17.

When titrating the same solution with only two light-sensitive cells, 13 and 17 may be fixed resistances and 14 and 16 the light-sensitive cells provided with red and green filters.

The invention is further illustrated by the following examples.

Example 1

(a) In the titration of acids with alkalies by means of phenolphthalein as indicator, two red filters having a transmission maximum at 650 to 700 Nm. and two green filters having a transmission maximum at 550 Nm. are used. At the wavelength of the red filters, phenolphthalein does not absorb in the alkaline range, whereas the green filters correspond to the absorption maximum of phenolphthalein. As already mentioned, the balancing potentiometer 15 is adjusted at the beginning of the titration so that no voltage is measured at the points 11 and 12 (see FIGURE 3). Flow of titrant from the burette continues until a voltage occurs at the points 11 and 12 by the change in color of the indicator, and this voltage is used to interrupt the flow of the titrant via a control unit.

The titration solution may be cloudy or may have for example a yellow, brown, green or blue intrinsic color. Titration may be carried out with very dilute alkalies, for example 0.01 N, or with strong alkalies, for example 2 N.

In the same way alkalies may be titrated with acids using phenolphthalein as the indicator and using the same filters. In this case the end points of the bridge are adjusted to zero potential prior to the beginning of the titration and without addition of indicator. Then indicator is added and titration is continued until zero potential is again reached.

(b) In the titration of alkalies with acids using methyl orange as indicator, there are used two red filters having a transmission maximum at more than 600 Nm., a wavelength at which neither the yellow form nor the red form of the indicator absorbs, and two yellow green filters having a transmission maximum at 530 Nm., a wavelength at which the red form of the indicator absorbs strongly but the yellow form does not absorb.

(c) In the titration of alkalies with acids using bromothymol blue as indicator, use is made of two orange filters having a transmission maximum at 600 Nm., a wavelength at which the blue form of the indicator absorbs strongly, but the yellow form of the indicator does not absorb, and two green blue filters having a transmission maximum at 450 Nm., a wavelength at which the yellow form of the indicator absorbs strongly, but the blue form does not absorb. At the beginning of the titration a titration vessel containing a titrated solution is placed in the titration equipment and the bridge is adjusted to zero. The vessel containing the yellow solution is then exchanged for a vessel containing the blue solution to be titrated and titrant is run in from the burette until the bridge zero is again reached.

Example 2

In the titration of iron(II) salt solutions with a solution of potassium permanganate according to Zimmermann-Reinhardt, two red filters are used having a transmission maximum at 650 to 700 Nm., a wavelength at which the potassium permanganate solution does not absorb, and two yellow green filters having a transmission maximum at 500 to 550 Nm., a wavelength at which the potassium permanganate solution absorbs strongly. The bridge is adjusted to zero at the beginning of the titration. At the end point, the titration solution assumes the color of the permanganate. The disturbance of the bridge balance thus caused induces a voltage at the bridge ends and this is utilized to shut off the flow of titrant.

Example 3

In the complexometric titration of an aluminum salt solution, this is mixed with an excess of cyclohexane diaminotetraacetic acid and back-titrated with a 0.05 N solution of zinc chloride. Xylenol orange is used as indicator; this changes from pale yellow to purple red. To carry out the titration use is made of two red filters having a transmission maximum at 650 Nm., a wavelength at which neither the red nor the yellow form of the indicator absorbs, and two yellow green filters having a transmission maximum at 550 Nm., a wavelength at which the red form of the indicator absorbs strongly but the yellow form only weakly. Control of the flow of titrant is effected as described in Example 1.

We claim:

1. Apparatus adapted for use in automatic colorimetric titration of solutions in a light-transparent vessel, which apparatus comprises means for passing diffused light through liquid to be titrated in said vessel, diffused light sensitive cells arranged in bridge connection and positioned to receive diffused light from said means after said light has passed through the liquid in said vessel, a color filter positioned to intercept said diffused light in front of each cell, and said filters having different colors such that the intensity of the light impinging upon the respective cells from said diffused light is changed differently when the color of the liquid being titrated changes, thereby producing a change of potential across said bridge.

2. Apparatus as claimed in claim 1 wherein the colors of said filters correspond respectively to the color of said liquid and its complementary color prior to the change in color of said liquid.

3. Apparatus as claimed in claim 1 wherein the colors of said filters correspond respectively to the color of said liquid and its complementary color after the change in color of said liquid.

4. Apparatus as claimed in claim 1 wherein the colors of said filters respectively correspond to the color of said liquid prior to its change in color and to the color of said liquid after said change in color.

5. Apparatus as claimed in claim 1 wherein the colors of said filters respectively correspond to the complementary color of the color of said liquid prior to its change in color and to the complementary color of said liquid after its change in color.

References Cited

Osborn et al.: Anal. Chem. 15, No. 10, Oct. 15, 1943, pp. 642–646.

MORRIS O. WOLK, Primary Examiner

R. M. REESE, Assistant Examiner

U.S. Cl. X.R.

250—218; 356—184